Patented Dec. 10, 1946

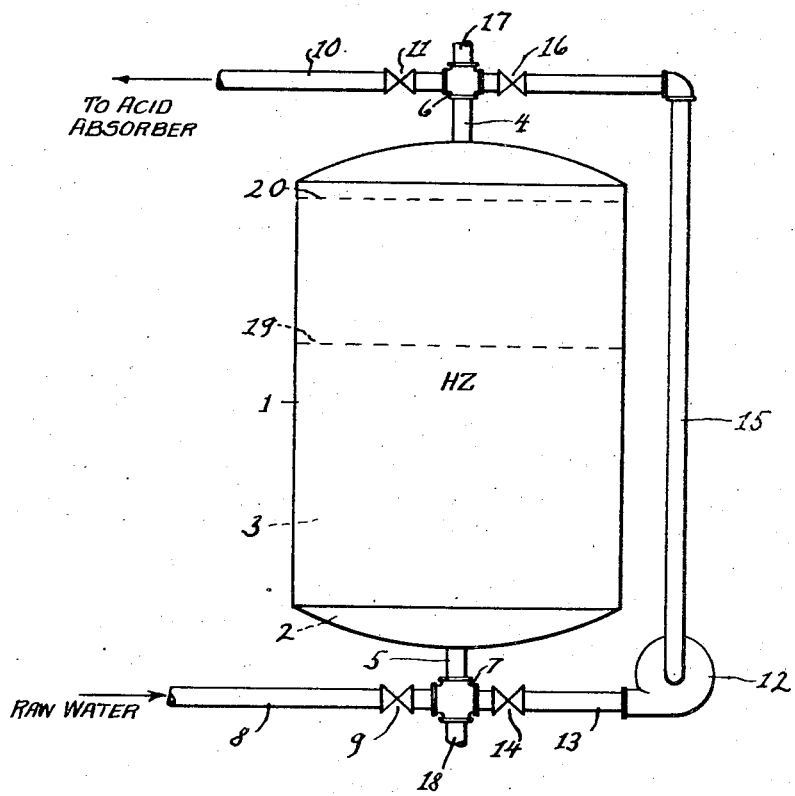

2,412,328

UNITED STATES PATENT OFFICE 2,412,328

METHOD AND APPARATUS FOR TREATING WATER COMPRISING THE STEPS OF PASSING A VARIABLE FLOW OF RELATIVELY ALKALINE WATER UPWARDLY THROUGH A BED OF ORGANIC HYDROGEN-ZEOLITE AND AUGMENTING SAID FLOW BY HYDROGEN-ZEOLITE TREATED WATER

John J. Felsecker, Calumet City, Ill., assignor to Graver Tank & Mfg. Co., Inc., a corporation of Delaware Application April 13, 1944, Serial No. 530,886

2 Claims. (Cl. 210—24)

This invention relates to liquid treatment, and particularly to the softening or demineralizing of water by organic zeolite softeners.

It is an object of this invention to increase the efficiency of such zeolite softeners, which efficiency may be expressed in terms of grains of minerals removed from the water by each cubic foot of the zeolite material, in each operating cycle pursuant to regeneration with a certain kind and amount of regenerating fluid.

Another object is to reduce the so-called color throwing of such zeolite softeners, that is, the releasing of color from the zeolite material into the water being treated; particularly in the event that the temperature, or the alkalinity, or pH of the water is relatively high.

A further object is to pass a flow of the water to be treated upwardly through a bed of organic zeolite, and to augment said flow at least at some times by water recirculated from a point past the zeolite bed, so that the flow is rapid enough at all times to suspend the organic zeolite of the bed, but not so rapid as to entrain the organic zeolite of the bed, whereby the efficiency of the zeolite is increased and the color throwing decreased.

Still other objects will appear from the following discussion:

Both upflow softeners and organic zeolite softeners are well known, and no claim is made for such a softener or zeolite, as such. It is also known that each kind of softener, and of zeolite material, has certain advantages as well as disadvantages.

The chief advantage of organic zeolite is that it can withstand the action of acid. As a result, it can be used to treat a water of extremely low pH. It can even be regenerated by acid, whereby it is put in the so-called hydrogen cycle and allows the demineralizing of the water. However, the organic zeolites known at the present time have the disadvantage that they tend to throw a color. This color may be a light yellow to a deep brown; the intensity increases with the pH and temperature of the water and is furthermore proportional to the time of contact between zeolite and water, or inversely proportional to the rate of flow of the water through the zeolite.

Upflow softeners have two main advantages over downflow softeners: they tend to provide greater capacity, with an identical type and amount of zeolite; and they require no backwash, incident to regeneration. However, in case of variable flow rates, upflow softeners are much less efficient and sometimes practically inoperable.

The temperature of the water enters into this situation also. Depending on the rate and temperature of the water flowing upwardly through the zeolite bed, this bed will be expanded to a variable extent. Obviously, the softener has to be high enough to accommodate the maximum expansion to be expected; and it might seem that no difficulties could follow so long as sufficient height of the softener tank is provided. Actually, however, particular difficulties are encountered in case of low flow rates. Such rates fail to expand the zeolite bed. As a result there is a tendency of the water to "channel" through the zeolite bed as soon as the flow rate falls below a certain limit. As a result, the water then escapes practically untreated. It is inherent in any upward filtration that such channeling occurs at certain points; the exact points, of course, being dependent on numerous factors, including specific weight, size, surface area and shape of granules; flow rate, temperature, and viscosity of the liquid, etc.

These various characteristics of the zeolite granules and of the water flowing through the same are dependent on numerous requirements, which need not be described herein. As a result, it was found that, generally speaking, channeling is avoided in upflow softeners using siliceous zeolite so long as the flow rate amounts to at least 2 to 3 gallons per minute per square foot of the zeolite bed; this figure of 2 or 3 gallons being an average, and the exact minimum rate depending mainly on the specific weight of the particular kind of zeolite used.

The organic zeolites known to the art are lighter than the siliceous zeolites. In downflow softeners, this fact has good and bad results; it allows a saving in backwash flow rate, but constitutes a danger in case of relatively high backwash rates or low temperatures of the backwash water.

It has occurred to me that the inherent feature of lower specific weight of the organic zeolite is a special advantage of this material in upflow softeners, since it lessens the tendency to channel with relatively low rate upward flows. Accordingly, it can be expected that the balance of advantages and disadvantages is more favorable for upflow softeners using organic zeolites than for other upflow softeners.

It is an object of this invention to improve the effect and economy of softeners and zeolites by making use of the facts stated above.

In the following, reference will be had to the drawing, the sole figure of which is a diagram of an embodiment of this invention.

I provide a vertical, cylindrical tank 1, with a flow distributing underdrain 2, supporting a bed 3 of organic zeolite. This zeolite is identified by the letters "HZ," the letter "Z" standing for zeolite, and the letter "H" indicating that the zeolite is in a hydrogen cycle.

Top and bottom pipes 4 and 5 enter the tank, in upper and lower parts of the tank respectively, and are connected to top and bottom crossfittings 6 and 7 respectively. The hard water inlet pipe 8 is connected with the bottom fitting 7, through a valve 9. The outlet pipe 10 is connected to the top fitting 6 through the valve 11, and leads to the usual acid absorption or degasification unit (not shown) which can be combined with the hydrogen zeolite softener in well known manner; or in some cases, particularly with organic sodium softeners, the treated water may flow to the point of use or storage direct.

A pump 12 has its discharge pipe 13 connected to the bottom fitting 7 through a valve 14, while the pump suction pipe 15 is connected to the top fitting 6, through a valve 16.

The fittings 6 and 7 have additional outlet connections 17 and 18 respectively, communicating with conventional piping, fittings, valves, and equipment for regenerating purposes (not shown). In a hydrogen zeolite plant, a source of diluted acid (not shown) will generally be included in the connections communicating with the top fitting 6.

In operation, the water to be treated flows through the pipes 8 and 5, into the softener tank 1, upwardly through the bed 3 of organic zeolite, to be collected as treated water above this bed and withdrawn through the pipes 4 and 10. The rate of upward flow is such that the bed of zeolite is expanded, whereby the top level of the bed is raised from the plane 19 to a plane 20; the plane or level 19 being that which is formed when the zeolite is allowed to settle down in the tank, in the absence of a zeolite expanding flow, and the level or plane 20 being one which provides substantial expansion while avoiding entrainment of zeolite material into the top outlet 4. Due to this upward flow and expansion, the granules of the zeolite are lifted, and separated from one another, so that the water can contact and wash each granule from all sides, whereby the relatively high capacity inherent in upflow softeners is utilized, and the retention of dirt on the zeolite granules is prevented.

In order to prevent the rate of upward flow from falling below the critical minimum rate at which channeling starts, I make use of the pump 12 and valves 14 and 16. Whenever the flow rate in the main flow circuit defined by the supply pipe 8, zeolite bed 3, and outlet pipe 10 falls below the critical limit, I add a flow in the recirculating circuit defined by the top pipe 4, suction pipe 15, pump 12, discharge pipe 13, bottom pipe 5, and zeolite bed 3, thereby augmenting the flow in the aforementioned main flow circuit, and providing a total rate of upward flow above the critical limit.

This can be achieved in a number of different ways. The pump 12 may be at rest until such recirculation is needed, or it may be running continuously. In either event, at least one of the valves 14 and 16 should be closed until recirculation is required, in order to avoid by-passing of raw water around the zeolite bed, and excessive expansion of the zeolite bed in case of maximum flows through the inlet pipe 8. However, when a low rate of the main flow through the inlet pipe 8 is observed, the said recirculating circuit should be opened and the pump either started or allowed to continue in operation. When high rates of the main flow occur, the recirculating flow should be checked, for instance by slowing up the pump, or closing the valves 14 and 16.

In some instances, the recirculation may be governed to be inversely proportional to the flow of raw water through the pipe 8; or it may be governed so as to provide a substantially uniform top level 20 of the expanded zeolite bed 3. In order to govern the recirculating rate properly, either of the valves 14 or 16 should be constructed so that it can be used as a throttling valve. The throttling may be effected manually, or by suitable automatic devices (not shown). The other valves, including Nos. 9 and 11, may be ordinary shut-off valves.

The opening and closing of the several shut-off valves, again, may be performed manually, or automatically by suitable timing devices (not shown).

It will be understood that the vital danger of channeling can be avoided by this recirculating system. Of course, this requires some additional capital expenditure for the pump and recirculating piping, valves, and fittings. This is generally compensated or even overbalanced by the operating savings due to the higher capacity of the upward flow softener, which are safely achieved by means of this recirculation.

A further advantage is obtained in connection with the color throwing of the organic zeolite. The time of contact between the water to be treated and the zeolite is reduced by the recirculated flow, if any. Thus an excessive contact time and degree of color throwing is avoided even in case of the lowest flow rates, which otherwise, as mentioned, are very dangerous.

This advantage is particularly outspoken in the case that the organic zeolite is used in a hydrogen cycle. In softeners using organic zeolite in a hydrogen cycle, even a highly alkaline raw water is rendered acid at once, as it hits a freshly regenerated zeolite bed. As a result, at that time no color throwing, or only a very small and unobjectionable degree thereof tends to occur. However, as the treatment goes on, the acidity of the effluent tends to fall off.

In downflow softeners on the hydrogen cycle, the treatment immediately after regeneration occurs mainly in the top layer of the zeolite, but later on during the softening cycle, the bulk of the treatment occurs in the lower part of the zeolite bed. From this time on, an alkaline water passes thru the top layer, if the raw water is alkaline in nature. In that event, the color throwing is substantially increased towards the later parts of the softening period without any change of the rate of downward flow.

This color throwing is also increased by pressure on the zeolite bed. Such pressure is always present in downflow softeners, and tends to increase as the downward flow causes the bed to pack.

The upflow softener as proposed herein tends to produce an average, low degree of color throwing, substantially uniformly throughout the service, since packing is eliminated and substantially no layers are allowed to be formed. As a result, while color throwing in some instances is not entirely eliminated, this upflow always eliminates the most intense color.

I claim:

1. Method of water treatment comprising the steps of passing a variable flow of a relatively alkaline water into and upwardly through a bed of organic hydrogen zeolite, and augmenting said flow by hydrogen-zeolite treated water recirculated from a point past said zeolite bed, so as to expand said zeolite bed to a substantially uniform level, while reducing the alkalinity of the water passing into said bed.

2. Apparatus for water treatment comprising a tank, a bed of organic zeolite in said tank, a supply pipe for water to be treated connected to the bottom of said tank, an outlet pipe for treated water connected to the top of said tank, suitable connections for acid regeneration of said bed, a pump, a discharge pipe connected to said pump and to the bottom of said tank, and a suction pipe connected to said pump and to the top of said tank.

JOHN J. FELSECKER.